Figure 1:
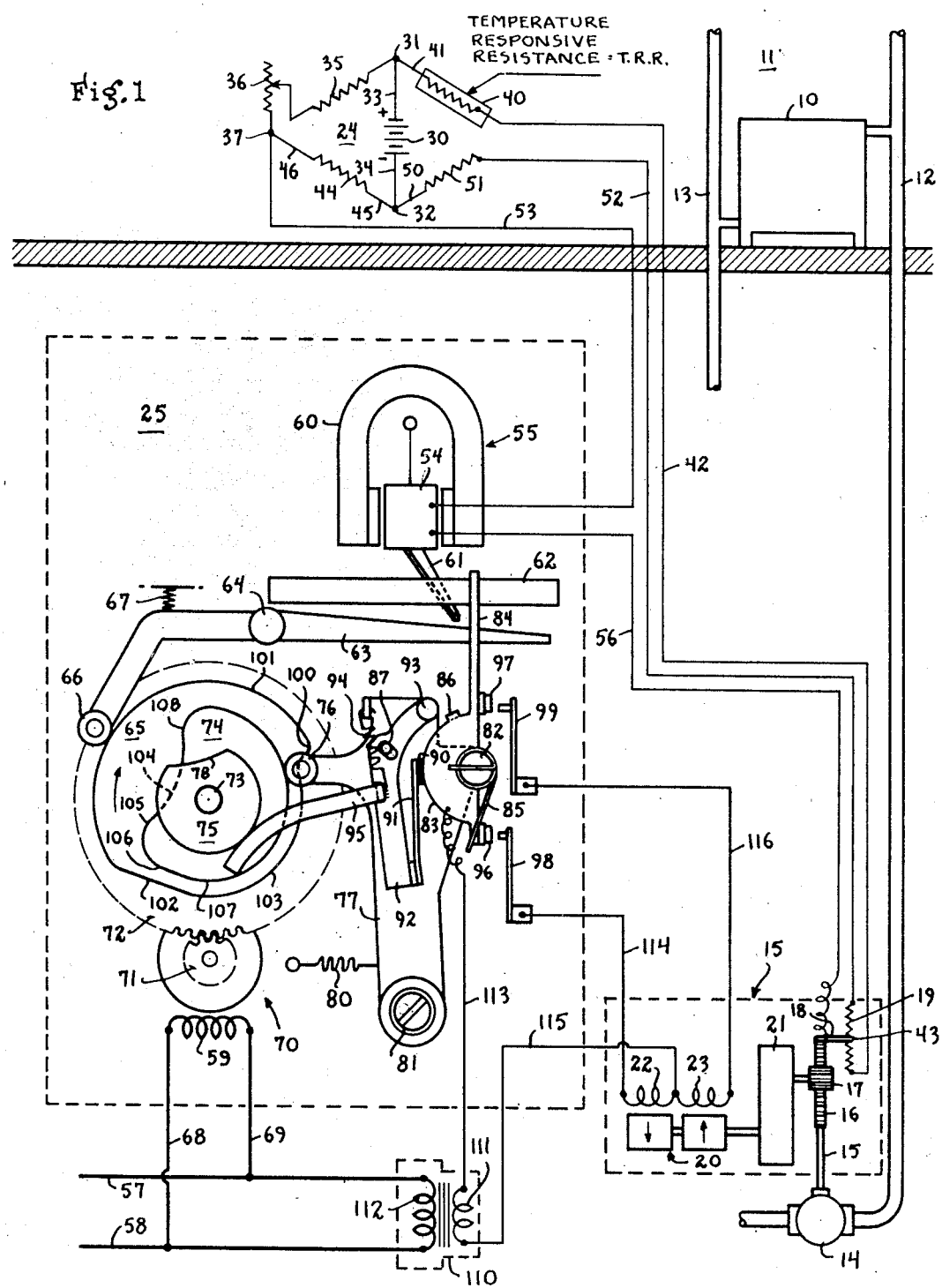

Oct. 5, 1943. W. H. GILLE 2,331,182
SENSITIVE RELAY MECHANISM
Filed Sept. 4, 1941 3 Sheets-Sheet 1

INVENTOR
Willis H. Gille
BY
George H. Fisher
ATTORNEY

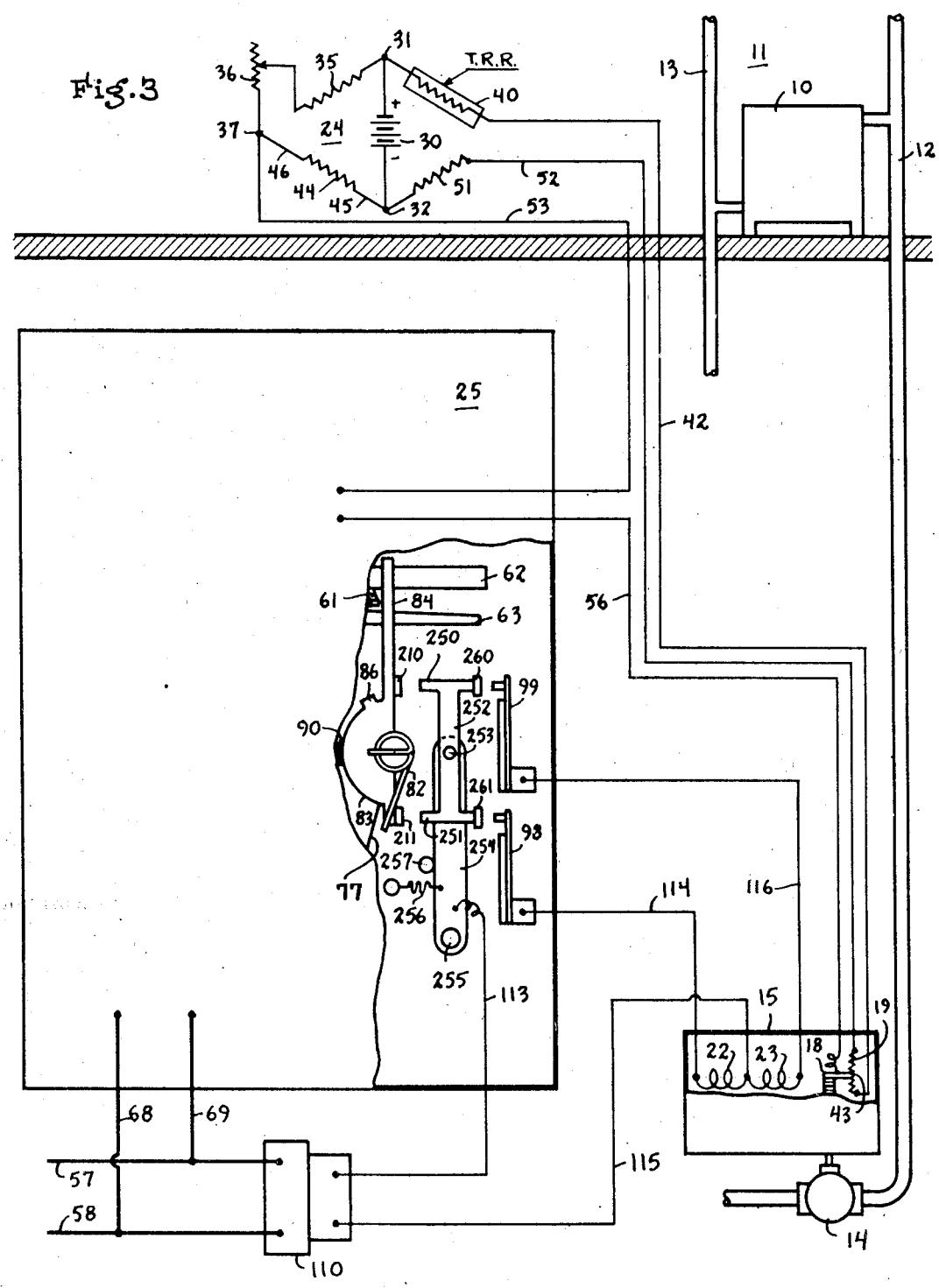

Patented Oct. 5, 1943

2,331,182

UNITED STATES PATENT OFFICE 2,331,182

SENSITIVE RELAY MECHANISM

Willis H. Gille, St. Paul, Minn., assignor to Minneapolis-Honeywell Regulator Company, Minneapolis, Minn., a corporation of Delaware Application September 4, 1941, Serial No. 409,523

20 Claims. (Cl. 236—70)

The present invention relates to sensitive relay mechanism, and particularly to that type of mechanism wherein the operation of a motor is controlled in accordance with the position of a pointer of a delicate galvanometer.

Such mechanisms generally include a device for periodically clamping the galvanometer pointer. Each time the pointer is clamped, a member is moved into engagement with the pointer, and a switch mechanism is then operated in accordance with the position attained by the member. When such a device is used to control a motor, the switching arrangement usually operates the motor in one direction or the other, depending upon the direction of deflection of the galvanometer from its center position. The period of operation of the motor is usually fixed in such devices but certain mechanisms have been constructed wherein the period of motor operation is varied in magnitude according to the magnitude of deflection of the galvanometer pointer from its center position. In all such mechanisms of the prior art known to the applicant, the period of motor operation has been varied in a finite number of fixed steps. Rebalancing control systems using such instruments having had the disadvantage that when the galvanometer pointer was approaching center position, the motor would be driven too far on its last periodic operation, thus causing the pointer to be deflected in the opposite direction. This overshooting of the control point might be repeated several times in succession, causing the value of the condition being controlled to oscillate about the value which the system was supposed to maintain. This type of oscillatory operation is known as "hunting."

It is therefore an object of the present invention to provide a sensitive relay device applicable to condition control systems wherein a condition changing device is controlled in accordance with the deflection of a galvanometer pointer, wherein the tendency of the relay device to cause "hunting" of the system is substantially overcome.

Another object of the invention is to provide a relay device for periodically energizing a motor in accordance with the deflection of a galvanometer pointer, wherein the duration of the period of motor energization is substantially proportional to the deflection of the pointer.

A further object of the present invention is to provide a relay device of the type described wherein the period of motor operation is modulatingly varied in accordance with the pointer position. A still further object is to construct such a device wherein the period of motor operation is varied from zero when the pointer is in center position to continuous motor operation when the pointer is at a position of maximum deflection.

A further object of the present invention is to provide a sensitive relay mechanism of the type described, wherein the period of motor operation is proportional to the pointer deflection over most of the operating range of the instrument, and wherein means is provided to reduce the period of operation below the normal proportionality as the pointer approaches its center position.

A further object of this invention is to provide an improved sensitive relay mechanism which shall be simple and inexpensive in construction.

A further object of the invention is to provide an improved switch mechanism for a relay of the type described. A still further object is to provide a mechanism for simultaneously operating a double-throw switch and a slidewire potentiometer in accordance with the deflection of a galvanometer pointer.

Figure 2:
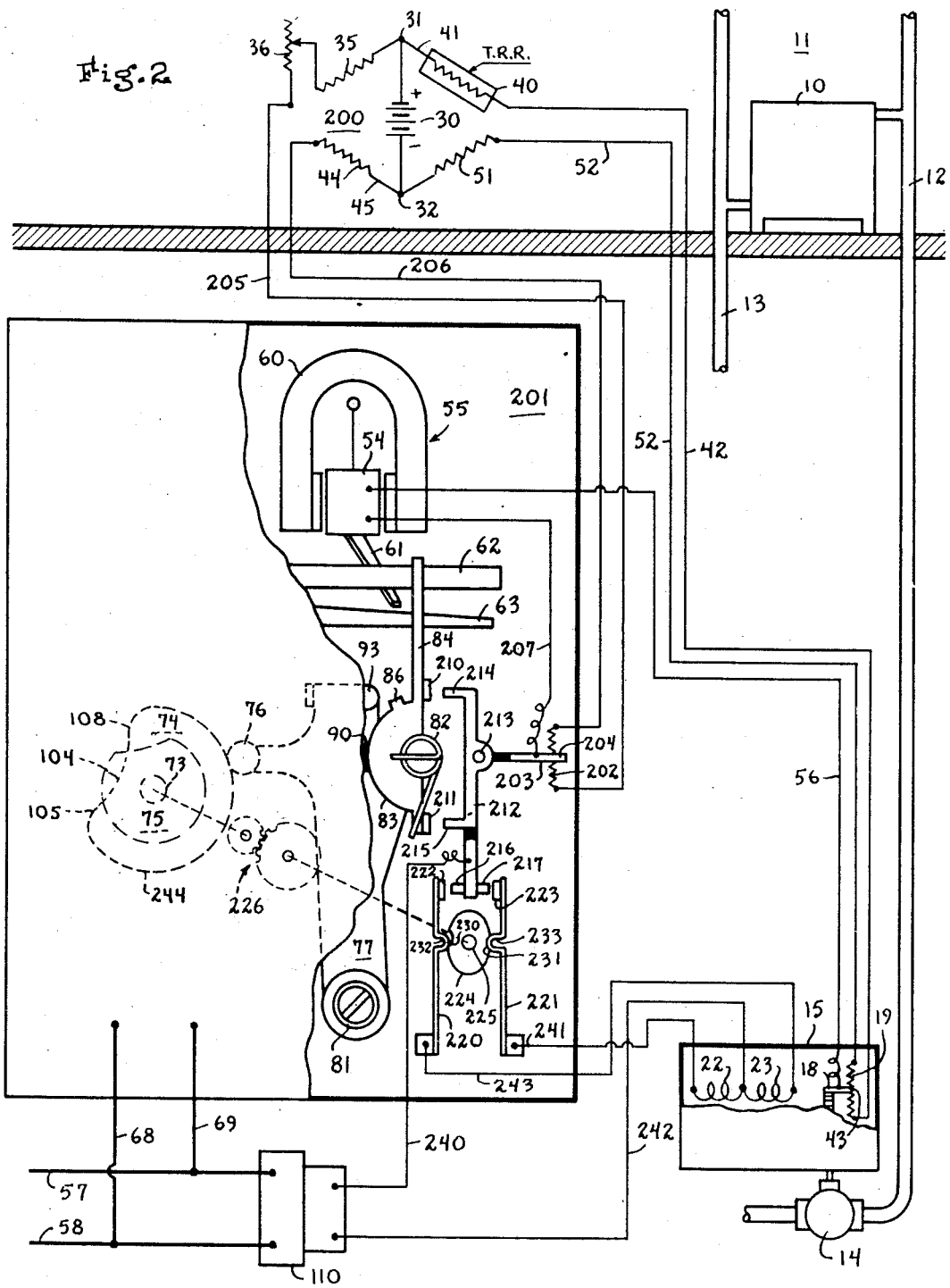

Other objects and advantages of my invention will become apparent from a consideration of the attached specification, claims, and drawings, of which Figure 1 is a diagrammatic sketch of a control system using a sensitive relay mechanism and embodying certain features of my invention, Figure 2 is a diagrammatic sketch of a different control system using a modified form of the sensitive relay mechanism of Figure 1, and Figure 3 is a diagrammatic sketch illustrating a control system using still another form of my sensitive relay mechanism.

*Figure 1*

Figure 1 illustrates a system for controlling the supply of heating fluid to a radiator 10 in accordance with the temperature of the space 11 in which the radiator 10 is located. A heating fluid which may be, for example, steam or hot water is supplied to the radiator 10 through a supply pipe 12. This fluid, after losing its heat, flows out of the radiator 10 through a return pipe 13. The supply of fluid to the radiator 10 through the pipe 12 is controlled by a valve 14. The valve 14 is operated by a control mechanism generally indicated at 15, which includes a rack 16 mounted on the valve stem and cooperating with a pinion 17. The pinion 17 is driven by a motor 20, through a gear train schematically shown at 21. The motor 20 is provided with a pair of windings 22 and 23 which drive the motor in opposite directions. The operation of the motor 20 is controlled by a bridge circuit generally indicated at 24 whose output is amplified by a sensitive relay mechanism 25. Supported by the rack 16 is a slider 18 which is moved across a slidewire resistance 19 in accordance with the position of the valve.

The bridge circuit 24 is supplied with electrical energy from a suitable source, shown in the drawing as a battery 30, connected to input terminals 31 and 32 by conductors 33 and 34, respectively.

The upper left arm of the bridge, as it appears in the drawing, incudes a fixed resistor 35 and a variable resistor 36. This arm of the bridge connects input terminal 31 wtih an output terminal 37. The variable resistor 36 is provided so that the temperature at which the bridge is balanced may be adjusted.

The upper right arm of the bridge includes a resistance element 40 of nickel or some other material having an appreciable temperature coefficient of resistance. Although the system will be described as though the element 40 had a positive temperature coefficient, it will be readily apparent to those skilled in the art that an element having a negative temperature coefficient could be used with equal facility. One end of the resistance element 40 is connected to input terminal 31 through a conductor 41, and the other end of resistance element 40 is connected to the lower terminal of slidewire resistance 19 through a conductor 42. The upper right arm of the bridge circuit 24 also includes that part of the slidewise resistance 19 between its lower terminal and the point of contact of slider 18 along the resistance 19. This point of contact is numbered 43 in the drawings and serves as one of the output terminals of the bridge circuit 24.

The lower left arm of the bridge includes a fixed resistance 44 connected to input terminal 32 by a conductor 45 and to output terminal 37 by a conductor 46.

The lower right arm of the bridge circuit 24 includes a conductor 50, a fixed resistance 51, a conductor 52, and that portion of the slidewire resistance 19 between its upper terminal and the output terminal 43.

The output circuit of the bridge 24 may be traced from output terminal 37 to output terminal 43. This output circuit includes a conductor 53, a coil 54 of a galvanometer generally indicated at 55, and a conductor 56 connected to the slider 18.

The coil 54 is mounted between the poles of a permanent magnet 60, and is attached to a pointer 61 which is deflected from a neutral position in accordance with the magnitude and direction of the current flowing through the coil 54. The pointer 61 moves parallel to a bar 62, against which it is periodically clamped by a clamping lever 63 pivoted at 64, and operated by a cam 65 acting against a follower 66 on the end of clamping lever 63 at the opposite side of the pivot 64 from the portion which engages the pointer 61. The follower 66 is biased for engagement with the cam 65 by a spring 67.

The cam 65 is continuously rotated by a motor 70 acting through gears 71 and 72, the latter being attached to a shaft 73 on which the cam 65 is also fixed. Also fixed on the shaft 73 are two more cams 74 and 75. The cam 74 acts against a follower 76 mounted on a supporting arm 77, which is mounted on a fixed pivot, as at 81. The arm 77 is biased by a spring 80 so that the follower 76 engages the surface of the cam 74.

Pivotoally mounted, as at 82, on the arm 77 is a switch operator 83. The switch operator 83 is provided with a long vertical extension 84 which is adapted to move transversely to the path of movement of pointer 61. This switch operator 83 is biased for counter-clockwise rotation about the pivot 82 by a spring 85. Counter-clockwise rotation of the operator 83 with respect to the arm 77 is limited by a stop 86 which extends rearwardly from the operator and engages a portion of the arm 77 when the operator reaches a limiting position.

Rotation of the switch actuating member 83 is prevented by a brake 90 mounted at one end of a leaf spring 91 whose other end is attached to a lever 92, which is pivoted to the arm 77, as at 93. A spring 94 biases the lever 92 for clockwise rotation about the pivot 93 and its movement is limited by a pin and slot connection shown at 87. A long transverse extension 95 of the lever 92 engages the cam 75. Rotation of the cam 75 serves to periodically release the brake 90 and permits rotation of the switch actuating member 83 about the pivot 82. The spring 94 holds extension 95 in engagement with cam 75.

Mounted on the member 83 are a pair of switch contacts 96 and 97 which selectively cooperate with stationary contacts 98 and 99 to control the energizing circuits of the motor 20.

The cam 65 which operates the clamping lever 63 is provided with a riser portion 100, a high dwell portion 101, a gently sloping dropoff portion 102, and a low dwell portion 103. As the cam 65 rotates clockwise, as indicated by the arrow in the drawing, the clamping lever 63 is held out of engagement with the pointer 61 as long as the follower 66 rides on the high dwell portion 101 of the cam. As the follower 66 moves down the dropoff portion 102, the lever 63 is moved into engagement with the pointer 61 by the spring 67. The lever 63 is maintained in engagement with the pointer 61 as long as the follower 66 rides on the low portion 103 of the cam. When the follower 66 rides up the riser portion 100, the lever 63 is moved away from the pointer 61, freeing it.

The cam 74 which reciprocates the arm 77 through the follower 76 comprises a low portion 104, a riser portion 105, a first dropoff portion 106 of relatively short length and steep slope, a second dropoff portion 107 of considerably greater length and gentler slope, and an abrupt dropoff portion 108 connecting the portion 107 with the low portion 104. The arm 77 is at its extreme left-hand position when the follower 76 is engaging the low portion 104. As the follower 76 moves up the riser portion 105, 77 is moved rapidly to the right carrying with it the switch actuating member 83. This moves extension 84 out of the range of movement of pointer 61. As the follower 76 moves down the dropoff portion 106, the arm 77 is moved rapidly to the left for a short distance. As the follower 76 moves on down the slow dropoff portion 107, the arm 77 continues to move to the left, but at a considerably slower rate. When the follower 76 reaches the abrupt dropoff portion 108, the arm 77 is moved very rapidly to the left until the follower 76 engages the low portion 104 of the cam 74. During this last very rapid movement, extension 84 again moves within the range of pointer 61.

Cam 75, which operates against the extension 95 of lever 92 and controls the rotation of lever 92 about the pivot 93, is substantially circular except for a small low portion 78. When the extension 95 is engaging the circular portion of the cam 75 the brake 90 is held in engagement with the switch operator 83. When the extension 95 is engaging the low portion 78, the brake 90 is lifted from the switch operator 83, allowing rotation of the latter about its pivot 82. Energy is supplied to the system for operating motors 20 and 70 by a pair of supply lines 57 and 58. Winding 59 of motor 70 is connected directly to lines 57 and 58 then conductors 68 and 69, respectively. Motor 20 is supplied with energy through a transformer 110 having a primary winding 112 connected to the lines 57 and 58, and a secondary winding 111.

*Operation of Figure 1 species*

When the parts are in the position shown in the drawing, the valve 14 is half open, and the slider 18 is therefore in its center position on the slidewire resistance 19. The amount of heating fluid supplied to the radiator 10 is just sufficient to keep the space 11 at the desired temperature and the bridge circuit 24 is therefore balanced. There is no current flowing in the output circuit of the bridge and the pointer 61 is accordingly in its central position.

The motor 70 is driving the cams 65, 74 and 75 in a clockwise direction. The lever 63 is in a position such that the pointer 61 is free, since the follower 64 is travelling along the dwell portion 101 of the cam 65. The arm 77 is moving slowly to the left as the cam follower 76 moves down the gently sloping dropoff portion 107. The brake 90 is being maintained in engagement with the switch operator 83 as the extension 95 rides on the circular portion of the cam 75.

As the cams continue to rotate in a clockwise direction, the follower 66 moves down the dropoff portion 102 of the cam 65, thus allowing the spring 67 to move the clamping lever 63 into engagement with the pointer 61, clamping it against the bar 62.

Since the bridge is balanced, the pointer will be clamped at its central position. As soon as the pointer 61 is clamped, the follower 76 reaches the abrupt dropoff portion 108 of the cam 74 and at approximately the same time the extension 95 of the lever 92 drops into the low portion 78 of the cam 75. Therefore the arm 77 is moved rapidly to its extreme left position and the brake 90 is lifted from the switch operator 83, which turns counter-clockwise about the pivot 82 until its extension 84 engages the clamped pointer 61. Soon after the extension 84 engages the pointer 61, thereby determining the position of movable contacts 96 and 97 with respect to the arm 77, the extension 95 moves out of the low portion 78 of cam 75, thereby applying the brake 90 to the switch operator 83, maintaining the contacts 96 and 97 in the position which was determined by the pointer 61. After the brake 90 has clamped the switch actuating member 83, the follower 76 engages the riser portion 105 of cam 74, moving the arm 77 with the contacts 96 and 97 mounted thereon rapidly to the right, and out of the range of pointer 61. The riser 100 on cam 65 then becomes effective to release the clamping lever 63 from engagement with the pointer 61.

The arrangement of the parts is such that, since the pointer 61 was clamped in a position at the center of its range of movement by the clamping lever 63, the switch actuating member 83 was likewise positioned at the center of its range of movement with respect to the supporting arm 77, by the engagement of extension 84 with pointer 61. The switch actuator 83 is maintained in this position with respect to the arm 77 by the brake 90. The contacts 98 and 99 are so positioned that when the switch actuator 83 is in its center position and the arm 77 reaches the right-hand end of its stroke, neither of the contacts 98 nor 99 will be engaged by the contacts 96 or 97, respectively. The motor 20 will therefore not be operated and the valve 14 will remain in the position to which it was previously moved.

The contacts 98 and 99 may alternatively be positioned so that both are engaged by contacts 96 and 97, respectively when the actuator 83 is in its center position, as such an arrangement will effectively prevent actuation of the motor 20.

Now let it be assumed that the temperature in the space 11 drops below the value which the resistance bridge 24 has been set to maintain by adjustment of the variable resistor 36. As the temperature drops, the resistance of the element 40 decreases, thereby making the potential of the output terminal 43 more positive than that of output terminal 37, if the polarity of the battery 30 is assumed to be that shown by the legend in the drawings. This causes a flow of current from output terminal 43 through conductor 56, coil 54 of galvanometer 55 and conductor 53, to output terminal 37. This current flowing through the coil 54 causes the pointer 61 to be deflected to the left of its center position. When the pointer 61 is next clamped by the clamping lever 63, it is therefore at a position to the left of center. When the switch actuator 83 is released by the brake 90 so as to be positioned by the pointer 61, it rotates to a position displaced in a counterclockwise direction from that shown in the drawings. The switch actuator 83 is held in this new position by the brake 90. In this position of actuator 83 the contact 96 is farther to the right than the contact 97. Accordingly, when the arm 77 is moved to the right by the cam 74, the contact 96 will engage the stationary contact 98.

Engagement of contacts 96 and 98 completes an energizing circuit for winding 22 of motor 20. This circuit may be traced from the upper end of secondary winding 111 of transformer 110 through a conductor 113, switch actuator 83, contacts 96 and 98, a conductor 114, winding 22 of motor 20, and a conductor 115, to the lower terminal of the secondary winding 111. Energization of winding 22 causes motor 20 to drive the valve 14 in opening direction. The opening movement of the valve 14 is accompanied by a corresponding upward movement of the slider 18 along the slidewire 19. This increases the portion of slidewire 19 which is connected in series with the temperature responsive resistance element 40 and correspondingly decreases the proportion of slidewire 19 which is connected in series with the fixed resistance 51. The potential of output terminal 43 is therefore changed in a negative direction and the valve 14 is opened wider so as to increase the heat supplied to the space. As long as the bridge remains unbalanced in the same sense, the system will intermittently operate the motor so as to open the valve and move the slider 18.

When this change has progressed sufficiently that the potential of output terminal 43 is equal to that of output terminal 37, the current ceases to flow in the output circuit of bridge 24, including the coil 54 of galvanometer 55. The pointer 61 therefore returns to its center position, and when the actuator 83 is next positioned by the pointer 61, it is positioned at the center of its range of movement. As a result of the positioning of member 83 at its center position, the motor 20 is deenergized, and no further movement of the valve 14 or of the slider 18 takes place until the bridge circuit 24 again becomes unbalanced.

Now consider that the temperature of the space 11 increases above the value which it is desired to maintain. The increase in temperature causes a corresponding increase in the resistance of the sensitive element 40, thereby changing the potential of output terminal 43 to a value more negative than that of output terminal 37. The difference of potential of the two output terminals is effective to cause a flow of current in a direction from terminal 37 to terminal 43 through conductor 53, coil 54 of galvanometer 55, and conductor 56. Since this current flows through the coil 54 in a direction opposite to that produced by a decreased space temperature, the pointer 61 will be deflected to the right of its center position. When the switch operator 83 is next positioned by engagement with the clamped pointer 61, it is therefore displaced in a clockwise direction from the position shown in the drawing. In such a position of the operator 83, the contact 97 will be further to the right than the contact 96. Therefore when the arm 77 approaches the right-hand end of the span of movement, the contact 97 will engage the contact 99.

Engagement of contacts 97 and 99 completes an energizing circuit for winding 23 of motor 20. This circuit may be traced from the upper terminal of secondary winding 111 through conductor 113, actuator 83, contacts 97 and 99, a conductor 116, winding 23 and conductor 115 to the lower terminal of secondary winding 111. Energization of winding 23 causes motor 20 to drive valve 14 in closing direction and to move slider 18 downward along resistance 19. This downward movement of the slider 18 causes a change of potential of output terminal 43 in a positive direction. This movement of the valve 14 and slider 18 continues intermittently as long as the bridge is unbalanced in the same sense. As soon as this change has progressed sufficiently that the potential of the output terminals 37 and 43 are equal, the current ceases to flow through the coil 54, and the pointer 61 returns to its center position. As soon as this takes place, the switch actuator 83 is likewise returned to its center position, and the motor 20 is deenergized. No further movement of the valve 14 or of the slider 18 takes place until the bridge circuit 24 is again unbalanced.

It will be seen, from the operation previously described, that the position of the switch actuator 83 with respect to the arm 77, is determined by the position of the pointer 61. It should also be apparent that the position of actuator 83 is not varied in any finite number of steps, but that for any change in the position of pointer 61, a corresponding change takes place in the position of actuator 83.

Considering for the moment the contact 96, it will be seen that as the position of pointer 61 varies to the left of its normal center position, the position of contact member 96 is varied to the right of its normal position. The distance of contact 96 from normal position is substantially proportional to the deflection of pointer 61 to the left of its center position. If the deflection of pointer 61 is small, the contact 96 is moved only a short distance to the right of its normal position. As the pointer 61 approaches the left-hand limit of its range of motion, the contact 96 will approach its limit of motion to the right. This latter limit is determined by engagement of stop 86 on switch actuator 93 with arm 77. If the contact 96 is moved to the right of its normal position, it engages the contact 98 when the arm 77 is moved to the right by the cam 74. Since the contact 98 is flexibly supported, it deflects to the right when engaged by the contact 96. When the contact 96 is moved again toward the left by arm 77, the contact 98 follows it, the contacts remaining in engagement until contact 98 reaches its normal position. The greater the distance of the position of contact 96 to the right of normal, the greater will be the distance which the follower 76 must move down the drop-off portion 107 before the contacts 96 and 98 separate. Therefore, the length of time the contacts 96 and 98 remain engaged is dependent upon the distance to which the contact 96 has been moved from its normal position. This in turn depends upon the position of the pointer 61. Since the rate of movement of arm 77 to the left is relatively low, being governed by the small change in radius of the drop-off portion 107 of the cam 74, it may be seen that a small change in the position of pointer 61 and hence in the position of contact 96 will cause a relatively great change in the time of engagement of contacts 96 and 98.

It should therefore be clear that the motor 20 is periodically operated at intervals whose beginnings are uniformly spaced, being governed by the rise portion 105 of cam 74 which is rotated by the constant speed motor 70. It should also be clear that the length of each interval is dependent upon the position of the pointer 61, and that any change in the position of pointer 61 causes a corresponding change in the length of the interval during which the motor is operated. If the pointer 61 remains at its neutral position, however, the motor 20 is not operated at all. Deflections of the pointer 61 in opposite directions from its neutral position cause operation of the motor 20 in opposite directions.

When the pointer 61 is near its center position, it is desirable that the length of the intervals of motor operation be reduced to a very small value. If this reduction in the length of the intervals were not made, movement of the slider 18 by the motor 20 might be sufficient, when the pointer is near its neutral position, to cause unbalancing of the bridge in the opposite sense, thereby causing pointer 61 to move through its center position and deflect slightly on the opposite side. On the next interval of motor operation, the opposite action might take place, with the result that the valve 14 and slider 18 would continuously oscillate about or hunt, their proper rebalancing position.

Means have therefore been provided in the present invention for reducing the ratio between deflection of pointer 61 and the length of the intervals during which motor 20 is operated, as the pointer 61 approaches its center position. This means comprises the first dropoff portion 106 of the cam 74. This portion 106 causes relatively rapid movement of the arm 77 toward the left during the first portion of its movement in that direction from its extreme right-hand position. As a result of this rapid motion to the left when motion in that direction is first started, it will be apparent that if the switch contact 96 is only a very short distance to the right of its normal position, it will be quickly moved away from engagement with the contact 98. The time of engagement of the contacts 96 and 98, and hence the time of operation of motor 20, is therefore proportionately much smaller when its length is determined by the first dropoff portion 106, than when its length is determined by the second relatively slow dropoff portion 107 of the cam 74. By thus reducing the length of the intervals of motor operation as the bridge circuit approaches a balanced condition, the length of the last period of motor operation may be made just long enough so that the corresponding movement of the slider 18 will just rebalance the bridge circuit without causing an unbalance in the opposite direction.

In the system described the length of the intervals of motor operation is varied as a continuous function of the deflection of the galvanometer pointer 61. It is true that the ratio of proportionality between these two conditions is changed as the pointer approaches its center position, but the function is nevertheless continuous, as for any change in position of the pointer 61, a corresponding change takes place in the length of the interval during which the motor 20 is operated. In other words, the length of the intervals of the motor operation may be said to be modulated in accordance with the position of pointer 61.

Species of Figure 2

In Figure 2 I have shown a control system embodying a modification of my invention in which the intervals of motor operation may be varied from zero when the bridge is balanced to continuous motor operation when the bridge is at a state of maximum unbalance. In this modification I have illustrated a different type of mechanism for reducing the ratio of proportionality between the deflection of the galvanometer pointer and the length of the period of motor operation as the pointer approaches its center position. An additional device which aids in preventing of the establishment of hunting conditions in the control system is also shown in this figure.

In Fig. 2, parts which are identical with those in the system of Figure 1 have been given the same reference numerals.

Figure 2 shows a radiator 10 for supplying heat to a space 11. The supply of fluid to the radiator is controlled by a valve 14, which is operated by a control mechanism 15, the operation of which is in turn controlled by the output of a bridge circuit 200, as amplified by a sensitive relay mechanism 201. The system, except for details of the bridge circuit and the relay mechanism, is similar to that of Figure 1.

The bridge circuit 200 is similar to the bridge circuit 24 of Fig. 1, except that a slidewire resistance 202 is provided, along which a slider 203 is moved by the relay mechanism 201. The point of contact between slider 203 and slidewire 202 is numbered 204 in the drawings, and serves as one of the output terminals of the bridge circuit 200, corresponding to output terminal 37 in the bridge circuit 24 of Fig. 1.

The upper and lower right arms of the bridge circuit 200 are the same as the upper and lower right arms respectively of the bridge circuit 24 of Fig. 1.

The upper left arm of the bridge circuit 200 connects input terminal 31 with output terminal 204. This arm includes a fixed resistance 35, a variable resistance 36, a conductor 205, and that portion of the slidewire resistance 202 between its lower terminal and the point of contact 204 of slider 203.

The lower left arm of the bridge circuit 200 connects input terminal 32 with output terminal 204. This arm includes conductor 45, fixed resistance 44, a conductor 206, and that portion of the slidewire resistance 202 between its upper terminal and the point of contact 204 of slider 203.

The output circuit of bridge 200 connects output terminals 43 and 204. This circuit includes conductor 56, coil 54 of galvanometer 55, and a conductor 207.

In the sensitive relay mechanism 201, the switch operator 83 carries no contacts such as 96 and 97 in Figure 1. The switch actuator 83 of Fig. 2 is instead provided with a pair of projections 210 and 211. A contact supporting member 212 is mounted by a slip-friction pivot indicated at 213 to the base of the sensitive relay mechanism 201. The supporting member 212 is provided with a pair of projections 214 and 215 which extend towards and are adapted to engage respectively the projections 210 and 211 on the switch operator 83. The slider 203 is rigidly attached to the contact supporting member 212 for movement therewith. The supporting member 212 carries at its lower extremity a pair of oppositely disposed contacts 216 and 217.

The lower extremity of supporting member 212 lies between a pair of flexible switch arms 220 and 221, which are adapted to engage the contacts 216 and 217 respectively. The arm 220 carries a contact 222 for engagement with the arm 216, and the arm 221 carries a contact 223 for engagement with the contact 217. The arms 220 and 221 are reciprocated towards and away from the supporting member 212 by an elliptical cam 224 mounted between the arms 220 and 221 on a shaft 225.

The cam shaft 225 is connected with the shaft 73 through suitable gearing indicated at 226, so that the shaft 225 operates at half the speed of shaft 73. The cam 224 is provided with notches 230 and 231, which are displaced slightly in opposite senses from the ends of the short axis of the ellipse. The arms 220 and 221 are provided with follower portions 232 and 233 respectively, which are adapted to ride on the surface of the cam 224.

The slip friction mounting of the member 212 is so designed that it may be rotated by the switch actuator 83, when the latter is more or less rigidly held by the brake 90, but that it may not be rotated by engagement of the flexible arms 220 and 221 therewith.

The cam 274 differs from the cam 74 of Fig. 1 in that the drop-off portions 106 and 107 have been replaced by a high dwell portion 244 of constant radius. The low portion 104, the riser portion 105, and the drop-off portion 108 correspond exactly to the similar portions of cam 74 in Fig. 1. The arm 77 is therefore moved to its extreme right-hand position by the riser 105, and maintained in that position by the dwell 244. When the follower 76 engages the drop-off portion 108, it moves to its left position rapidly.

Operation of Figure 2

The operation of the system shown in Figure 2 will first be described as though the slidewire 202 were omitted.

When the parts are in the position shown in the drawing, the valve 14 is supplying an amount of heating fluid to the radiator 10 which is just sufficient to keep the space 11 at the desired temperature. The bridge circuit 200 is therefore balanced, and the pointer 61 is in its central position. The extension 84 has engaged the pointer 61 while the latter was clamped in central position, and the switch operator 83 is therefore also in its central position. When the switch operator 83 is in its central position and the supporting member 77 is moved to the right, the contact supporting member 212 is engaged by either projection 210 or 211 and moved to a vertical position so that its lower extremity is midway between the switch arms 220 and 221. The proportions of the cam 224 are such that when the contact supporting member 212 is in its mid-position, neither contact 215 nor 217 is engaged by contacts 222 or 223. The motor in the control mechanism 15 is therefore not operated, and the valve 14 is maintained in its present position.

If the temperature in space 11 now drops below the value which the system has been set to maintain, the resistance of element 40 decreases, thereby making the potential of output terminal 43 more positive than that of terminal 204. This change in potential causes a current to flow through the output circuit of bridge 200, from terminal 43 to terminal 204, through conductor 56, coil 54, and conductor 207. This current flowing through coil 54 causes deflection of the pointer 61 to the left of its center position. Upon the next engagement of extension 84 with pointer 61, the switch operator 83 is moved to a position displaced in a counter-clockwise direction from that shown in the drawing. The projection 211 is thereby moved to the right of its center position, and on the next movement of the supporting arm 77 to the right, the projection 211 engages the projection 215 on contact supporting member 212 so as to move the latter to the right. This positions the contact 217 to the right of center, and when the switch arm 221 is next moved to the left by rotation of the cam 224, contact 217 is engaged by contact 223.

Engagement of contacts 217 and 223 completes an energizing circuit for winding 22 of the motor in the control mechanism 15. This circuit may be traced from the upper secondary terminal of transformer 110 through a conductor 240, switch contact supporting member 212, contacts 217 and 223, switch arm 221, a conductor 241, winding 22, and a conductor 242 to the lower secondary terminal of transformer 110. Energization of motor winding 22 causes the valve 14 to be driven in opening direction, thereby increasing the supply of heating fluid to the radiator 10. At the same time the slider 18 is driven upward along the slidewire resistance 19, thus making the potential of terminal 43 more negative, and thereby tending to rebalance the bridge circuit 200. As long as the bridge circuit remains unbalanced in the same sense, the contact 217 remains to the right of its center position, and the contacts 217 and 223 are intermittently engaged by the operation of cam 224. Each engagement of contacts 217 and 223 cause operation of the motor so as to open the valve wider and move the slider 18 upward so as to rebalance the bridge.

When the slider 18 has moved upward far enough, so that the bridge 200 is rebalanced, the pointer 61 returns to its center position. Upon the next movement of supporting arm 77 to the left, the actuator 83 is positioned by the pointer 61 at the center of its range of movement. As the supporting arm 77 moves back to the right, it engages the contact supporting member 212 and moves the latter to its center position, in which position the contacts 217 and 223 can no longer be engaged. The winding 22 is therefore deenergized and no further movement of the valve 14 or of the slider 18 takes place until the bridge circuit 200 again becomes unbalanced.

Now let it be assumed that the temperature of the space 11 rises above the value which it is desired to maintain. The increase in temperature causes a corresponding increase in the resistance of the sensitive element 40, thereby changing the potential of output terminal 43 to a value more negative than that of terminal 204. This difference of potential of the two output terminals is effective to cause a flow of current in a direction from terminal 204 to terminal 43 through conductor 207, coil 54 of galvanometer 55, and conductor 56. Since this current flows through the coil 54 in a direction opposite to that produced by a decrease in space temperature, the pointer 61 is deflected to the right of its center position. When the switch operator 83 is next positioned by engagement with the clamped pointer 61, it is therefore displaced in a clockwise direction from the position shown in the drawing. In such a position of the operator 83, the projection 210 will be moved to the right of its normal position. Therefore, when the arm 77 approaches the right-hand end of its movement, the projection 210 engages the projection 214 on the contact supporting member 212 and rotates the latter in a clockwise direction about its pivot 213, thereby causing the contact 216 to move to the left of its normal position. As the switch arm 220 is next moved to the right by operation of the cam 224, the contact 222 will engage contact 216.

Engagement of contacts 216 and 222 completes an energizing circuit for winding 23 of the control mechanism 15. This circuit may be traced from the upper secondary terminal of transformer 110 through a conductor 240, contact supporting member 212, contacts 216 and 222, switch arm 220, a conductor 243, winding 23, and a conductor 242 to the lower secondary terminal of transformer 110. Energization of winding 23 causes motor 20 to drive the valve 14 in closing direction and to move the slider 18 downward along resistance 19. This decreases the supply of heating fluid to the radiator 10 and at the same time the movement of the slider 18 causes a change in the potential of output terminal 43 in a positive direction. This movement of the valve 14 and slider 18 continues intermittently as long as the bridge is unbalanced in the same sense. As soon as this movement has continued long enough so that the potential of the output terminals 204 and 43 are equal, the current ceases to flow through the coil 54, and the pointer 61 returns to its center position. As soon as this takes place, the switch actuator 83, and consequently the contact supporting member 212 are likewise returned to their center position. The motor winding 23 is therefore deenergized and no further movement of the valve 14 or the slider 18 takes place until the bridge circuit 200 is again unbalanced.

It should be apparent from the foregoing description that the switch contact supporting member 212 is modulatingly positioned in accordance with the position of operator 83, and hence in accordance with the position of pointer 61. The proportions of cam 224 are such that when the member 212 is moved to one of its positions of maximum deflection, one of the switch contacts 216 or 217 continuously engages its associated contact 222 or 223. For example, in the case of contacts 217 and 223, when the contact supporting member 212 is in its position of maximum counterclockwise displacement from the position shown in the drawings, the contact 217 is moved so far to the right that by engagement with contact 223 it holds the follower portion 233 of switch arm 221 completely out of engagement with the cam 224, even when the long axis of the ellipse is in line with the follower portion 233. When the contact 217 is at a position intermediate its central position and its position of extreme deflection to the right, its engagement with contact 223 is periodically interrupted by operation of the cam 224 against the follower 233. Because of the elliptical shape of cam 224, the length of the period of engagement of contacts 223 and 217 is modulatingly varied in accordance with the deflection of contact 217 from its normal position. The elliptical shape of cam 224 therefore performs the same function as the slow drop-off portion 107 of cam 74 in Fig. 1.

The notches 230 and 231 of the cam 224 cause the followers 220 and 221 to move more rapidly as they near the center position of contacts 216 and 217. Because of this more rapid movement of the switch arms 220 and 221 near the center positions of contact 216 and 217, the length of the periods of engagement of the contacts are smaller in proportion to the contact deflection when those deflections are very small. In other words, these notches reduce the ratio of proportionality between the length of intervals of motor operation and the displacement of the contacts 216 and 217 from their center position, as those contacts approach that center position. The notches therefore have the same function as the first drop-off portion 106 on the cam 74 in Fig. 1.

Simultaneous engagement of contacts 216 and 217 with contacts 222 and 223 respectively, is prevented by making the notches 230 and 231 slightly offset from the ends of the short axis of the ellipse. Since these notches are offset, the switch arms 220 and 221 do not reach their limits of movement toward the contacts 216 and 217 simultaneously. Hence, simultaneous engagement of the two switches, due to vibration or other causes, with a consequent energization of both motor windings, is prevented.

The operation of the system of Fig. 2, as thus far described, is entirely analogous to the operation of the system shown in Fig. 1. The control mechanism 15 is operated at equally spaced intervals and the length of each interval is determined by the magnitude of the deflection of pointer 61 from its central position. The length of these intervals is modulated from zero when the pointer is in its central position to continuous motor operation when the pointer is at a position of maximum deflection.

The operation of the control system of Fig. 2, with the slidewire resistance 202 included will now be described. Assume that the bridge circuit 200 is balanced and that the supply of heating fluid through the valve 14 is just sufficient to maintain the temperature at its desired value.

Now consider that the temperature in the space 11 decreases below its desired value. As previously described, the pointer 61 will be deflected to the left with a resulting movement of the contact supporting member 212 in a counterclockwise direction and consequent energization of winding 22 in control mechanism 15. This causes movement of the slider 18 upwardly so that the resistance between terminal 43 and input terminal 31 is increased, thereby balancing the change in resistance of the sensitive element 40 due to the temperature decrease. At the same time, however, due to the counterclockwise movement of the supporting member 212, the slider 203 will be moved upwardly along the slidewire resistance 202. This will tend to make the potential of output terminal 204 more negative, and hence will tend to cause a flow of current in the output circuit of bridge 200 in a direction from output terminal 43 to output terminal 204. This current flow is in the same direction as that caused by the initial unbalancing of the bridge due to the decrease in resistance of sensitive element 40. The initial effect of the resistance slidewire 202 upon an unbalancing of the bridge, is therefore to increase that unbalance. The resistance 202 is however lower in value and hence has a smaller effect upon the bridge circuit than the balancing resistance 19. Therefore as movement of slider 18 along slidewire 19 continues in response to the unbalance of the bridge, the rebalancing effect of slidewire 19 overcomes the unbalancing effects of the sensitive resistance element 40 and the slidewire 202, and the current in the output circuit of the bridge begins to decrease. As the current in the output circuit decreases, pointer 61 moves back to the right towards its central position. The contact supporting member 212 is correspondingly moved by the relay mechanism 201 in a clockwise direction about its pivot 213, so that the slider 203 moves downwardly along the resistance 202. Movement of the slider 203 downwardly along the resistance 202 has the same effect on the balance of the bridge circuit as the movement of slider 18 upwardly along resistance 19. The effect of slider 203 is now to aid the rebalancing of the bridge circuit. The rebalancing takes place much more rapidly with both slidewires 202 and 19 adding their rebalancing effect.

It may therefore be seen that the initial effect of slidewire 202 is to exaggerate temporarily any unbalance which occurs, thereby making the system more sensitive to unbalance. As the rebalancing mechanism responds to this exaggerated unbalance, and begins to bring the system again to a balanced condition, the slidewire 202 operates to make the rebalancing action more rapid. The net effect of the operation of slidewire 202 is therefore to accelerate the operation of the system as a whole, thereby increasing its sensitivity.

In a control system, the presence of a time lag between a call for operation by the controlling element and the response of the controlled element may cause the establishment of the condition known as hunting. Such a lag is inherently present in every condition-responsive control system, since it is necessary that a change in the controlling condition takes place before the system responds. If the response is delayed too long while the condition continues to change, the response is apt to be greater than is necessary to bring the condition to its desired value. This may cause the condition to change in the opposite direction from the desired value, with the result that the control system, after another delay, causes the condition to change back in the direction of its initial deviation. Any device which will reduce the lag of a control system will oppose its hunting tendency.

In other words, it may be stated that the hunting tendency of a system may be reduced by introducing a corrective factor which is proportional to the rate of system operation. The unbalancing effect of slidewire 202 on the bridge circuit 200 depends upon the position of slider 204, and hence of supporting member 212. The position of the latter member, as previously described, governs the length of the periods of operation of the controlling motor, and hence the rate of system operation. The slidewire 202 therefore introduces a corrective factor proportional to the rate of system operation.

Figure 3

Figure 3 shows a system which is the same as that of Fig. 1 with the exception of the switch contact mechanism operated by the sensitive relay. In Fig. 3 parts which are identical with those in Fig. 1 have been given the same reference numerals.

The switch operator 83 in Fig. 3 carries a pair of projections 210 and 211, similar to those on the operator 83 in Fig. 2. These projections 210 and 211 are adapted to cooperate with projections 250 and 251 respectively on a movable contact carrying member 252. The member 252 is mounted through a slip friction pivotal connection 253 on the extremity of an arm 254 which is pivoted at its lower end 255 to the base of the sensitive relay mechanism 25. The arm 254 is biased for movement to the left by spring 256, and its movement in that direction is limited by a stop 257.

The member 252 carries contact portions 260 and 261, which are adapted for cooperation for stationary contacts 99 and 98 respectively.

Operation of Figure 3

The system shown in Fig. 3 operates as a system in a manner quite similar to that of the system shown in Fig. 1. The particular switching mechanism shown operates however in a manner more analogous to the switching arrangement shown in Fig. 2.

When the switch operator 83 is displaced in a counter-clockwise direction from the position shown in Fig. 3, its next engagement with the member 252 causes the latter to be likewise displaced in a counter-clockwise direction. This displacement of the member 252 in a counter-clockwise direction about the pivot 253 continues until both projections 210 and 211 engage the projections 250 and 251 respectively. When both sets of projections are engaged further movement of the arm 77 to the right causes the arm 254 to move also to the right, causing engagement of contact 261 with contact 98.

In a similar manner displacement of operator 83 in a clockwise direction from the position shown in the drawing causes engagement of contact 260 with contact 99. Due to the shape of cam 74 driving the arm 77 the duration of the period of contact engagement is modulated in accordance with the position of pointer 61 in the same manner as the modulation described and shown in connection with the operation of the system of Fig. 1.

The switching mechanism shown in Fig. 3 has a characteristic similar to that of Fig. 2, namely, that of being able to cause continuous engagement of the switch contacts in response to a maximum deflection of the pointer 61. When the operator 83 is positioned at the limit of its movement in either direction, its next engagement with the member 252 will cause rotation of the latter to such an angle that the contact 260 or 261 will engage the stationary contacts 99 or 98, respectively, when the arm 254 is in a vertical position.

It will be seen therefore that the switch mechanism shown in Fig. 3 possesses certain advantages also shown by the more complicated switching mechanism of Fig. 2, but not present in the simple mechanism of Fig. 1.

Although I have shown and described certain modifications of my invention, it will be understood that I do not wish to be limited by the particular system shown and described herein, but only by the scope of the appended claims.

I claim as my invention:

1. In a sensitive relay mechanism, in combination, a control element, means for engaging said control element so as to cause it to perform a control function, said means including an operator element movable along a predetermined path in which said control element lies and a member for supporting said operator element, first means for moving said operator element along said path comprising means for reciprocating said supporting member to move said elements into engagement periodically, and second means for moving said operator along said path comprising means for modulatingly positioning said operator element with respect to said supporting member to vary the duration of said periodical engagements.

2. In a sensitive relay mechanism, in combination, a first control element, means for engaging said first control element so as to cause it to perform a control function, said means including a second control element movable along a predetermined path in which said first control element lies and a member for pivotally supporting said second control element, said member being biased to a first position in which said elements are normally disengaged, first means for moving said second control element along said path comprising means for reciprocating said supporting member to move said elements into engagement periodically, and second means for moving said second control element along said path comprising means for modulatingly positioning said second control element with respect to said supporting member to vary the duration of said periodical engagement, the proportions of said second control element being such that when said supporting member is in said first position and said second control element has been moved by said second means to an extreme position, said elements are continuously engaged.

3. In a sensitive relay mechanism, in combination, a member movable in accordance with the variations of a variable condition, an element for performing a control function, an element for operating said control element, an arm for pivotally supporting said operating element, a brake on said arm for restraining movements of said operating element relative thereto, means for moving said operating element alternately into engagement with said member and said control element, means for restraining movement of said member just before and during engagement of said operator element therewith, and means for releasing said brake before engagement of said operator element with said member and for applying said brake after said operator has been positioned relative to said arm by said member.

4. In a sensitive relay mechanism, in combination, an element for performing a control function, an element for operating said control element, an arm for pivotally supporting said operating element, means for positioning said operating element with respect to said arm, and means for reciprocating said arm to engage said operating element alternately with said positioning means and said control element, the position of said operating element with respect to said arm determining the time of engagement of said elements, said reciprocating means including means for varying the speed of motion of said arm over different portions of its travel to change the relative effect of certain positions of said operating element on the length of said time of engagement.

5. In a sensitive relay mechanism, in combination, an element for performing a control function, an element for operating said control element, an arm for pivotally supporting said operating element, said operating element having a normal position with respect to said arm, means for moving said operating element from said normal position, and means for reciprocating said arm to engage said operating element alternately with said moving means and said control element, the position of said operating element with respect to said arm determining the period of engagement of said elements in such a manner that the period is increased as the operating element position departs from said normal position, said reciprocating means including means for increasing the speed of said arm at the portion of its travel nearest the control element to decrease the proportion between the period of engagement and the departure of said operating element from normal when said operating element is near said normal position.

6. In a sensitive relay mechanism, in combination, a pair of switch arms for performing a control function, switch contact means engageable by said switch arms selectively, said contact means having a normal position, means for modulatingly positioning said contact means in accordance with the variations of a variable condition, means for reciprocating said switch arms toward and away from said contact means, the position of said contact means determining the particular switch arm engaged and the duration of said engagement, said duration being substantially proportional to the distance of the position of the contact means from normal position, said reciprocating means including means for increasing the speed of said switch arms at the point of their travel nearest said contact means so as to reduce said duration of said engagement in proportion to the distance of the contact means from normal when said contact means is near said normal position.

7. In a sensitive relay mechanism, in combination, switch contact means having a normal position, a pair of spaced switch arms for selectively engaging said contact means, said contact means being positioned between said switch arms, means biasing said switch arms into engagement with said contact means, means for reciprocating said switch arms toward and away from said contact means, said reciprocating means comprising a single elliptical cam mounted between said arms and constantly rotating, and means for moving said contact means along the path of motion of said switch arms, so that the position of said contact means along said path determines the particular switch arm to be engaged with said contact means, and the length of the periods of engagement.

8. In a sensitive relay mechanism, in combination, a slidewire resistance member, operating means including a slider for cooperating with said resistance member and switch contact means, said operating means being mounted for movement as a unit and having a normal position, a pair of spaced switch arms for selectively engaging said contact means, said contact means being positioned between said switch arms, means biasing said switch arms into engagement with said contact means, means for reciprocating said switch arms toward and away from said contact means, said reciprocating means comprising an elliptical cam mounted between said arms and constantly rotating, and means for moving said operating means so that said slider moves along said slidewire and said contact means moves along the path of motion of said switch arms, the position of said contact means along said path determining the particular switch arm to be engaged with said contact means and the length of the periods of engagement.

9. A sensitive condition control system, comprising in combination, a galvanometer including a pointer having a normal position, means for deflecting said pointer in accordance with the variations of a variable condition, condition changing means, means for operating said condition changing means including a motor, switch means for controlling said motor, an operator for said switch means, means for alternately positioning said operator in accordance with the position of said pointer and then engaging said operator and said switch means, and means for varying the duration of such periodical engagements in accordance with the deflection of said pointer.

10. A sensitive condition control system, comprising in combination, a galvanometer including a pointer having a normal position, means for deflecting said pointer in accordance with the variations of a variable condition, condition changing means, means for operating said condition changing means including a motor, switch means for controlling said motor, an operator for said switch means, means for modulatingly positioning said operator in accordance with the position of said pointer, means for periodically engaging said operator and said switch means, and means for varying the duration of such periodical engagements in accordance with the deflection of said pointer, the proportions of said operator being such that upon an extreme deflection of said pointer, said motor is operated continuously.

11. A sensitive condition control system, comprising in combination, a galvanometer including a pointer having a normal position, means for deflecting said pointer including a normally balanced electrical network having a condition responsive element therein, condition changing means, means for operating said condition changing means including a motor, switch means for controlling said motor, an operator for said switch means, means for modulatingly positioning said operator in accordance with the position of said pointer, and means for periodically engaging said operator and said switch means, means for varying the duration of such periodical engagements in accordance with the deflection of said pointer, and means for introducing an unbalancing effect in said network proportional to the average rate of motor operation, said last-named means comprising a slidewire resistance connected in said network, a slider for cooperation with said resistance, and a connection between said switch operator and said slider for moving said slider along said resistance when said operator is moved.

12. In a sensitive relay mechanism, in combination, switch contact means having a normal position, a pair of spaced switch arms for selectively engaging said contact means, said contact means being positioned between said switch arms, means biasing said switch arms into engagement with said contact means, means for reciprocating said switch arms toward and away from said contact means, said reciprocating means comprising an elliptical cam mounted between said arms and constantly rotating, and means for moving said contact means periodically along the path of motion of said switch arms, said moving means comprising a second cam continuously rotated at a speed twice that of said elliptical cam, said cams being related in time phase so that the position of said contact means is changed when said switch arms are at positions remote from the normal position of said contact means.

13. In a sensitive relay mechanism, in combination, switch contact means having a normal position, a pair of spaced switch arms for selectively engaging said contact means, said contact means being positioned between said switch arms, means biasing said switch arms into engagement with said contact means, means for reciprocating said switch arms toward and away from said contact means, said reciprocating means comprising an elliptical cam mounted between said arms and constantly rotating, and means for moving said contact means along the path of motion of said switch arms, so that the position of said contact means along said path determines the particular switch arm to be engaged with said contact means and the length of said engagement is substantially proportional to the movement of said contact means from said normal position, said cam having a pair of notches displaced slightly in opposite senses from the ends of the short axis of said ellipse, said notches increasing the speed of movement of said switch arms at the end of their travel nearest said contact means, and said displacement preventing simultaneous engagement of said switch arms with said contact means.

14. A control system, comprising in combination, a normally balanced electrical network including a condition responsive impedance, a galvanometer with a pointer having a normal position and connected in said network, said galvanometer pointer being deflected in response to an unbalance of said network, control means, means responsive to pointer deflection for periodically operating said control means, said last-named means including means for varying the length of the periods of operation as a continuous function of the deflection of said pointer from normal position, said function being such that the ratio of length of period to deflection increases with increasing deflection.

15. In a sensitive relay mechanism, in combination, a member normally movable in accordance with the variations of a variable condition, a control device to be operated in accordance with said condition, an operator for said control device, means including a reciprocable support for moving said operator between a first position in which it engages said member and is thereby positioned with respect to said support and a second position in which it operatively engages said control device for a period of time dependent upon its position with respect to said support, means for clamping said member just before and during engagement of said member by said operator, brake means for fixing the position of said operator with respect to said support, and means for releasing said brake means during engagement of said member by said operator.

16. In a sensitive relay mechanism, in combination, a member normally movable in accordance with the variations of a variable condition, a control device to be operated in accordance with said condition, an operator for said control device, means including a reciprocable support for moving said operator between a first position in which it engages said member and is thereby positioned with respect to said support and a second position in which it operatively engages said control device for a period of time dependent upon its position with respect to said support, means for clamping said member, means for operating said clamping means to fix said member just before and during engagement thereof by said operator and to release said member at all other times, brake means for fixing the position of said operator with respect to said support, and means for releasing said brake means during engagement of said member by said operator.

17. Control apparatus, comprising in combination, a normally balanced electrical network, variable impedance means in said network for producing an unbalance effect therein, a member positioned in accordance with the unbalance of said network, means for rebalancing said network, motor means for driving said rebalancing means, switch means for controlling said motor means, means for periodically operating said switch means, means for varying the duration of said periodical operations in accordance with the position of said member, and variable impedance means operable in accordance with the position of said member for introducing an unbalance effect in said network proportional to the average rate of motor operation.

18. In combination, a galvanometer having a pointer, control means to be operated in accordance with the deflection of said pointer from a normal position, and means responsive to deflection of said pointer for periodically operating said control means, said last-named means including means for varying the length of the periods of operation as a continuous function of the deflection of said pointer from normal position, said function being such that the ratio of length of period to deflection increases with increasing deflection.

19. In a sensitive relay mechanism, in combination, an element for performing a control function, an element for operating said control element, an arm for pivotally supporting said operating element, said operating element having a normal position with respect to said arm, means for moving said operating element from said normal position, means for reciprocating said arm to engage said operating element alternately with said moving means and said control element, the position of said operating element with respect to said arm determining the period of engagement of said elements in such a manner that the period is increased as the operating element position departs from said normal position, said reciprocating means comprising a single cam operated at a constant speed in cooperation with a follower on said arm, and means biasing said arm to engage said follower with said cam, said cam being formed so as to increase the speed of said arm at the portion of its travel nearest the control element, thereby decreasing the proportion between the period of engagement and the departure of said operating element from normal when said operating element is near said normal position.

20. In a sensitive relay mechanism, in combination, an element for performing a control function, an element for operating said control element, an arm for pivotally supporting said operating element, said operating element having a normal position with respect to said arm, means for moving said operating element from said normal position, means for reciprocating said arm to engage said operating element alternately with said moving means and said control element, the position of said operating element with respect to said arm determining the period of engagement of said elements in such a manner that the period is increased as the operating element position departs from said normal position, said reciprocating means and said speed increasing means comprising a single cam operated at a constant speed in cooperation with a follower on said arm, means biasing said arm to engage said follower with said cam, said cam having a first drop-off portion of relatively short length and steep slope for moving said arm rapidly away from said control element during the first portion of its travel in that direction, and a second drop-off portion of greater length and gentler slope for moving said arm slowly away from said control element during the ensuing portion of its travel in that direction so as to increase the speed of said arm at the portion of its travel nearest the control element, thereby decreasing the proportion between the period of engagement and the departure of said operating element from normal when said operating element is near said normal position.

WILLIS H. GILLE.